(12) United States Patent
Chapman (10) Patent No.: US 11,032,441 B2
(45) Date of Patent: Jun. 8, 2021

(54) WATERMARK PRINTED ON MATCHING COLOR MEDIA FORMING METAMERIC PAIR

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/385,633

(22) Filed: Apr. 16, 2019

(65) Prior Publication Data

US 2020/0336623 A1 Oct. 22, 2020

(51) Int. Cl.
*H04N 1/32* (2006.01)
*G06T 1/00* (2006.01)
*G06F 3/12* (2006.01)

(52) U.S. Cl.
CPC ....... *H04N 1/32149* (2013.01); *G06F 3/1243* (2013.01); *G06T 1/0021* (2013.01); *G06T 1/0042* (2013.01); *G06T 2201/005* (2013.01)

(58) Field of Classification Search
USPC ............................................ 101/491; 283/72
See application file for complete search history.

(56) References Cited

U.S. PATENT DOCUMENTS

| | | | |
|---|---|---|---|
| 4,796,921 A * | 1/1989 | Neiman | B41M 3/005 283/902 |
| 5,826,916 A * | 10/1998 | Phillips | B41M 3/14 283/91 |
| 6,763,122 B1 | 7/2004 | Rodriguez et al. | |
| 6,947,175 B1 * | 9/2005 | Caruthers | G03G 9/08 358/1.9 |
| 7,053,910 B2 * | 5/2006 | Newman | H04N 1/6052 345/604 |
| 8,007,578 B2 * | 8/2011 | Bhatt | B41M 3/14 106/31.9 |
| 8,064,100 B2 | 11/2011 | Braun et al. | |
| 8,330,991 B2 | 12/2012 | Chin et al. | |
| 8,455,087 B2 | 6/2013 | Eschbach et al. | |
| 8,947,744 B2 | 2/2015 | Kurtz et al. | |
| 9,082,068 B1 | 7/2015 | Chapman | |

(Continued)

FOREIGN PATENT DOCUMENTS

CA WO/2005/051676 * 9/2005

*Primary Examiner* — Barbara D Reinier
(74) *Attorney, Agent, or Firm* — Gibb & Riley, LLC (57) ABSTRACT

A marking color of a marking material (e.g., ink, toner, etc.) within a printer has a marking spectral reflectance property. Print media that has a media color approximately matching the marking color, but a different media spectral reflectance property, is identified (to form a geometric metameric pair). Differently colored calibration patches of the marking material are printed on a test sheet of the print media. A calibration patch, in which the printed color of the marking material most closely visually matches the media color, is used to identify a revised marking color. A watermark is printed on the print media using the revised marking color. The difference between the marking spectral reflectance property and the media spectral reflectance property causes the watermark to be visibly observable on the print media from one angle but prevents the watermark from being visibly observable from a different angle.

18 Claims, 7 Drawing Sheets

(56) References Cited

U.S. PATENT DOCUMENTS

| | | | |
|---|---|---|---|
| 9,106,847 B2* | 8/2015 | Miller | B41J 2/21 |
| 9,148,546 B2* | 9/2015 | Miller | B41J 2/21 |
| 9,193,201 B2* | 11/2015 | Chapman | B42D 25/324 |
| 9,275,428 B2 | 3/2016 | Chapman | |
| 9,415,606 B2* | 8/2016 | Chapman | B41J 3/407 |
| 9,444,969 B2* | 9/2016 | Miller | B41J 2/21 |
| 9,516,190 B1* | 12/2016 | Chapman | H04N 1/32144 |
| 9,535,363 B2* | 1/2017 | Schlumm | G03G 15/0889 |
| 9,538,041 B1* | 1/2017 | Chapman | H04N 1/6008 |
| 9,614,995 B1 | 4/2017 | Chapman | |
| 9,621,760 B2 | 4/2017 | Rhoads et al. | |
| 9,674,391 B1* | 6/2017 | Chapman | G06F 3/1222 |
| 2004/0042021 A1* | 3/2004 | Wu | H04N 1/6033 |
| | | | 358/1.9 |
| 2010/0157350 A1* | 6/2010 | Yoshihara | H04N 1/00002 |
| | | | 358/1.14 |

* cited by examiner

WATERMARK PRINTED ON MATCHING COLOR MEDIA FORMING METAMERIC PAIR

BACKGROUND

Systems and methods herein generally relate to security printing and watermarks and more particularly to watermarks printed using one or more permanent colors.

In the area of security printing, documents are protected from copying, forging, and counterfeiting using multiple techniques. An example of documents that need security printing include prescription sheets where printed security features allow a pharmacist to be able to have a good level of confidence that the prescription sheets is genuine.

One type of watermark is a slightly different color watermark from the background color. Another type of watermark is a gloss watermark that is printed using a special gloss ink or toner, or special printing processes (e.g., different height toner piles, etc.). Many watermarks require such special (relatively more expensive) marking materials (inks, toners) or specialized printers, which increases the cost undesirably.

SUMMARY

As described in greater detail below, various methods herein identify a marking color of a marking material (e.g., ink, toner, etc.) within a printer. The marking material has a marking spectral reflectance property. These methods also identify a print media having a media color approximately matching the marking color but having a spectral reflectance property that is different from the marking material's spectral reflectance property.

The marking color and the media color form a geometric metameric pair and are, thus, matching colors with different spectral reflectance properties. Therefore, when viewed under most or all visible lighting conditions (e.g., the full range of lighting conditions within the human visible spectrum, e.g., within 380-740 nm), the media color and the marking color visually match when viewed by an observer. In some examples, the marking spectral reflectance property is different in spectral reflectance from the media spectral reflectance property by at least twice as much spectral reflectance.

Such methods alter the marking color to a revised marking color to cause a printed color of the marking material to more closely visually match the media color. In one example, the marking material is a permanent color and the revised marking color is a mixture of multiple permanent colors. When altering the marking color, these methods can print differently colored calibration patches of the marking material combined with different colorants on a test sheet of the print media. Then, these methods identify, as a matching calibration patch, one of the calibration patches printed on the test sheet in which the printed color of the marking material most closely visually matches the media color. This allows the methods herein to identify the revised marking color as the color that was used to print the matching calibration patch.

These methods print a watermark on the print media using the revised marking color with the printer. The printing of the watermark is performed by applying as little as a single layer of the marking material to the print media. The difference between the marking spectral reflectance property and the media spectral reflectance property causes the watermark to be visibly observable on the print media from a first angle and prevents the watermark from being visibly observable on the print media from a second angle that is different from the first angle.

Various systems herein include, among other components, a printing device that has a marking material (e.g., toner/ink) storage component that can be specifically configured to maintain a marking material that has a specific marking color and marking spectral reflectance property. Such systems also include a media supply that is configured to maintain print media having a media color that matches the marking color, but that has a spectral reflectance property that is different from the marking material's spectral reflectance property. The marking color and the media color form a geometric metameric pair and, thus, are matching colors with different spectral reflectance properties. For example, the marking spectral reflectance property is different in spectral reflectance from the media spectral reflectance property by at least twice as much spectral reflectance.

The printing device is adapted to print differently colored calibration patches of the marking material combined with different colorants on a test sheet of the print media. An optical scanner is included in these systems and is in communication with the printing device. The optical scanner is configured to scan the differently colored calibration patches on the test sheet.

Also, these systems include a processor that is in communication with the optical scanner and the printing device. The processor is configured to identify from the scan performed by the optical scanner, as a matching calibration patch, one of the calibration patches printed on the test sheet in which a printed color of the marking material most closely visually matches the media color.

The processor is also configured to identify a revised marking color used to print the matching calibration patch. For example, the marking material can be a permanent color and the revised marking color can be a mixture of multiple permanent colors. The printer is configured to print a watermark on the print media using the revised marking color. The watermark is printed by applying as little as a single layer of the marking material to the print media.

The difference between the marking spectral reflectance property and the media spectral reflectance property causes the watermark to be visibly observable on the print media from a first angle and prevents the watermark from being visibly observable on the print media from a second angle that is different from the first angle.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, one type of watermark is a slightly different color watermark from the background. Another type of watermark is a gloss watermark that is printed using a special gloss ink or toner, or special printing equipment. A gloss effect is considered acceptable if a watermark mostly appears at one angle and disappears at another.

To combat the high cost of specialized inks, toners, and specialty printers used to print gloss watermarks, the methods and systems herein provide a gloss watermark using as little as a single layer of standard inks and toners (a permanent color alone, or one mixed with other permanent colors) by using standard printing processing that prints with a single toner layer of permanent marking material used for all standard non-specialty print jobs (without higher than standard toner heights, etc.). The methods and systems herein provide a single color watermark that (when printed) matches the color of the media, but has a different spectral reflectance property from the media, which creates a gloss effect. Further, because the color of the printing and the print media match, when the sheet is copied the scanner would not detect any difference between the watermark and the sheet, preventing the watermark from appearing on any copies.

By printing the watermark to have the same color as the media, but with a different spectral reflectance property, the methods and systems herein produce a metameric pair. In a metameric pair the printing and paper are not visually distinguishable when viewed from one angle but are from another angle (relative to a light source) creating the gloss watermark without more expensive spot inks, toners, and/or printers.

Figure 1:
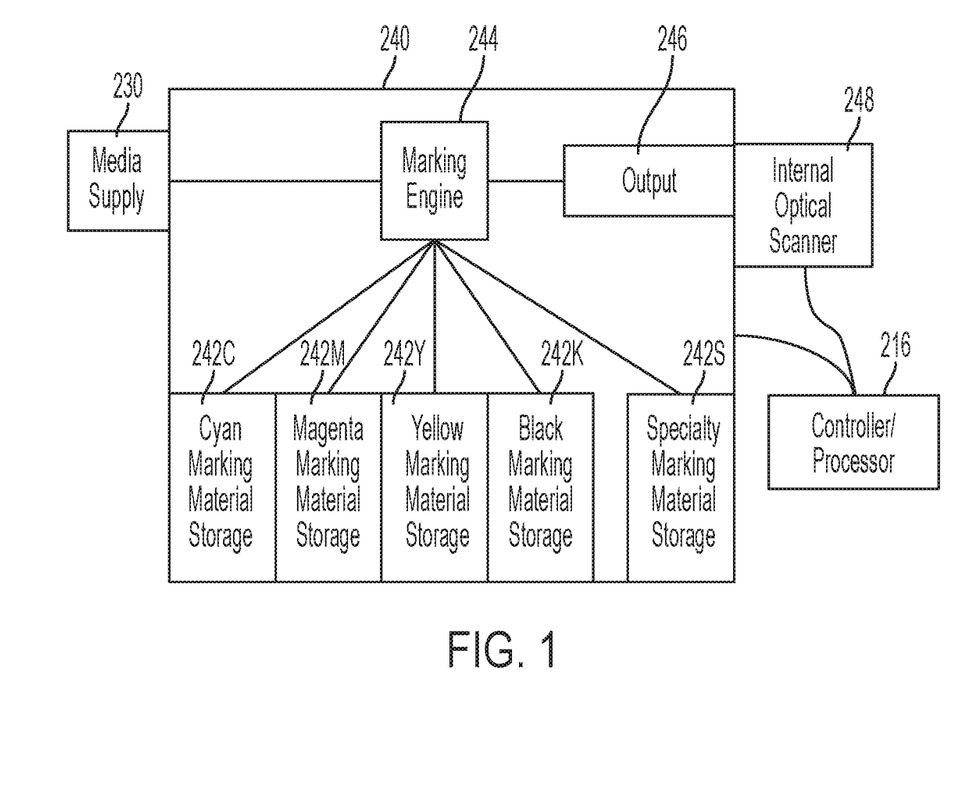
FIG. 1 is a schematic diagram illustrating devices herein.

FIG. 1 shows some components of exemplary systems herein, and such systems can include (among other components) a printing device/engine 240 (described in greater detail below with reference to FIG. 7) that has marking material (e.g., toner, ink, etc.) storage components (242C, 242M, 242Y, & 242K) that supply marking material to a marking engine 244. A media supply 230 (e.g., paper trays, etc.) that stores and supplies a continuous feed material web or sheets of print media to the marking engine 244, which uses the marking material(s) supplied from the marking material storage components (242C, 242M, 242Y, & 242K) to place markings on the print media and produce printed items, which are then supplied to an output 246. The printed items can be scanned with an optical scanner 248, if desired, before being output as a final product or sent on to additional processing. All such elements are directly or indirectly connected to and controlled by a controller or processor 216.

For example, it is common for printing devices to have multiple marking material storage components (242C, 242M, 242Y, & 242K) each of which is specifically reserved or configured to maintain only one type (color) of marking material. Each of the marking material storage components (242C, 242M, 242Y, & 242K) has a different marking color with a specific marking spectral reflectance property. For example, colors that are commonly referred to as "primary colors" or "permanent colors" (e.g., RGB (red, green, blue) with legacy systems; CMYK (cyan, magenta, yellow, black); etc.) are commonly used for the majority of printing jobs and each is provided an individual, dedicated marking material storage component (container, receptacle, etc.) with printers. Therefore, in the example shown in FIG. 1, marking material storage components (242C (cyan), 242M (magenta), 242Y (yellow), & 242K (black)) are shown for a printer that uses CMYK as permanent colors as a non-limiting example.

These marking material storage components (242C, 242M, 242Y, & 242K) can all be the same or can be restricted and distinguished by signage (e.g., a different color label on each different marking material storage component) or by shape/location. With respect to shape/location, the marking material storage components (242C, 242M, 242Y, & 242K) can have a shape or location within the printing device 240 that is only capable of physically excepting a specific cartridge shape, where each different cartridge shape/location is reserved for a specific color. Thus, a different shape of each different marking material storage component (242C, 242M, 242Y, & 242K) may allow each of the marking material storage components (242C, 242M, 242Y, & 242K) to only receive one specific color marketing material cartridge shape (each of which corresponds to a single color). Alternatively, the marking material storage components (242C, 242M, 242Y, & 242K) can simply be designated as being reserved for specific marketing material colors, without physical or signage restrictions.

Additionally, some printers include one or more specialty or spot marking material containers that are in addition to the marking material storage components (242C, 242M, 242Y, & 242K) for permanent colors. The specialty marking material containers are for spot marking materials that are used in lower quantities and/or less frequently than the permanent colors (e.g., clear, gold, silver, etc.) and that are more expensive than the permanent color marking materials, and an example of such a specialty marking material container 242S is shown in FIG. 1. In common use, one spot marking material will be loaded into the specialty marking material container 242S, a print job will be run and then possibly a different spot marking material will be loaded into the specialty marking material container 242S for the next print job. Cleaning may be required between loading of different marking materials. Therefore, unlike the marking material storage components (242C, 242M, 242Y, & 242K) each of which is dedicated to a single color (e.g., a permanent color), the specialty marking material container 242S can be used for many different colors and may not be used for all print jobs.

Certain print media can be identified that has a "media color" that matches the "marking color" of one of the primary marking materials stored in the marking material storage components (242C, 242M, 242Y, & 242K), but that has a spectral reflectance property (referred to herein as "media spectral reflectance property") that is different from a spectral reflectance property of the marking material (referred to herein as "marking spectral reflectance property"); and such print media is sometimes referred to herein as "watermark color matching media" for shorthand. The marking color of a corresponding marking material and the media color of the watermark color matching media form a geometric metameric pair and, thus, are visually matching colors with different spectral reflectance properties. The methods herein can select the marking material and/or select the print media to form a geometric metameric pair. Therefore, different processes herein can start with a specific color/spectral reflectance property of a marking material and select a corresponding print media to form a geometric metameric pair; or processes herein can start with a specific color/spectral reflectance property of a print media and select a corresponding marking material to form a geometric metameric pair.

When the marking material is printed on the corresponding watermark color matching media that forms a geometric metameric pair, a watermark is formed. More specifically, the difference between the marking material's spectral reflectance property and the media's spectral reflectance property causes the watermark to be visibly observable (to an observer, e.g., within a wavelength of 380-740 nm) on the watermark color matching media from a first angle, but prevents the watermark from being visibly observable (to an observer) on the print media from a second angle that is different from the first angle.

The media supply 230 can be merely capable of storing such watermark color matching media, or for certain specialized printing devices (e.g., specialized security feature printing devices) the media supply 230 (or a compartment thereof) can be specifically configured to only maintain the watermark color matching media by including signage (labels), physical restrictions (locks on paper trays), or other restricted devices (e.g., optical scanners within paper trays that produce error messages if media other than the watermark color matching media is loaded, etc.).

In some examples, the marking material's spectral reflectance property is different in spectral reflectance from the media's spectral reflectance property by at least twice as much spectral reflectance (e.g., 2×, 4×, 10×, 100×, etc.), using any measure of spectral reflectance. For example, one measure of spectral reflectance is relative to that of magnesium oxide (MgO) which is use as an arbitrary reference and given a reference value of 1.0 MgO. Therefore, one of these spectral reflectance properties may be 0.1 MgO, while the other may be 0.2 MgO or higher. Other measures of spectral reflectance are known, and this is only one example; and regardless of which measure is used, with systems herein the marking material's spectral reflectance property is different in spectral reflectance from the media's spectral reflectance property by at least twice as much spectral reflectance.

One issue that can arise is that the same color marking material may appear visually different when printed on different colors of print media. Thus, while the marking color and the corresponding watermark color matching media are described as having the same color above, sometimes when the marking material is actually printed on the watermark color matching media, the marking material may appear slightly visually different especially when printed on a non-white background, resulting in a less desirable watermark because of the visual detectability of the marking material on the watermark color matching media. In view of this, the systems herein can automatically or manually print differently colored test patches and revise the marking color until the marking color (when printed on the watermark color matching media) most closely visually matches the media color, and thereby create a highly effective watermark.

Figure 2:
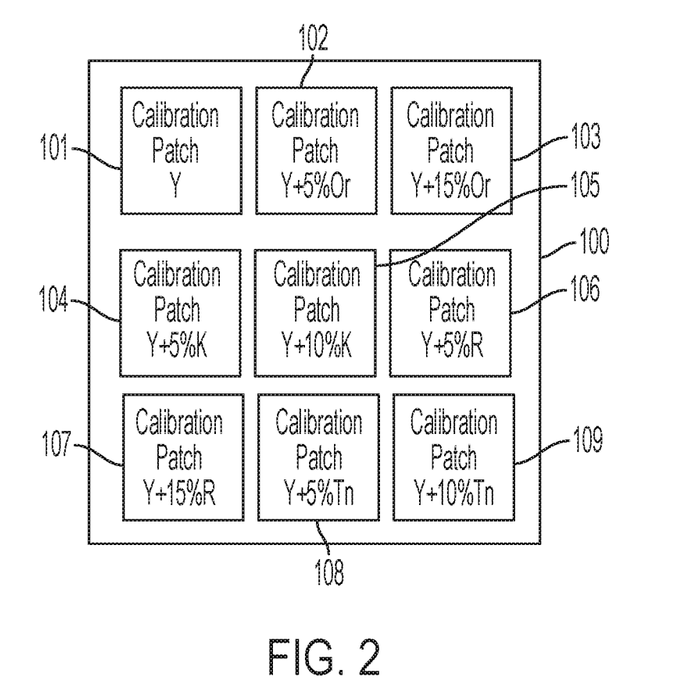
FIG. 2 is a schematic diagram illustrating a test sheet produced herein.

More specifically, as shown in FIG. 2, the printing device 240 is adapted to automatically print differently colored calibration patches 101-109 of the marking material randomly or systematically combined with different percentages of other colorants on a test sheet 100 of the print media. In some examples shown in FIG. 2, the calibration patches 101-109 can be a combination or permanent colors, or a combination of permanent and/or spot colors. For example, calibration patch 101 is only the permanent color yellow; calibration patch 102 is yellow combined with 5% orange (which is formed from a combination of other permanent colors); calibration patch 103 is yellow combined with 15% orange; calibration patch 104 is yellow combined with 5% black (which is a permanent color); calibration patch 105 is yellow combined with 10% black; calibration patch 106 is yellow combined with 5% red (which is formed from a combination of other permanent colors); calibration patch 107 is yellow combined with 15% red; calibration patch 108 is yellow combined with 5% tan (which may formed from a combination of other permanent and/or spot colors); and calibration patch 109 is yellow combined with 10% tan. Other color combinations can be utilized as these are merely examples when printing different versions of yellow marking material on yellow print media test sheet 100. While yellow marking material on yellow media is used in this example, any matching colors can be used including, for example, orange on orange, red on red, green on green, white on white, black on black, etc.

The optical scanner 248 is configured to automatically scan the differently colored calibration patches 101-109 on the test sheet 100. As noted above, the processor 216 is in communication with the optical scanner 248 and the printing device 240. The processor 216 is configured to identify from the scan performed by the optical scanner 248, as a matching calibration patch, one of the calibration patches 101-109 printed on the test sheet 100 in which the printed color of the marking material most closely visually matches the media color. The optical scanner 248 and processor 216 are configured to automatically detect light wavelengths (e.g., 380-740 nm) that are observable in multiple lighting conditions to find the best matching calibration patch that will allow the marking material printed on the print media to both be seen as the same color by observers in most or all lighting conditions that humans are capable of observing.

The processor 216 is also configured to then automatically identify (and output to the marking engine 244) a revised marking color that was used to print the matching calibration patch. Again, the marking material can be a permanent color and the revised marking color can be a mixture of multiple permanent colors or spot color. The printing device 240 is thus configured to automatically print a watermark on the print media using the revised marking color. The watermark can be printed by applying as little as a single layer of the permanent marking material to the print media, eliminating the need for specialized printing devices or specialized printing processes (that, for example, produce toner stacks of different heights or perform microprinting, etc.). Further, by using the standard permanent marking materials always present in the printing device 240 for standard, non-specialty ink/toner print jobs, the cost and convenience of producing the watermark is not different from printing print jobs that do not use spot marking materials.

With the above systems and processing, the color of the printing and the print media match. Therefore, when the sheet is copied, the copier's scanner would not detect any difference between the watermark and the sheet, preventing the watermark from appearing on any copies or unauthorized prints of the sheet. This allows a genuine original sheet containing the watermark described herein to be verified as an original and to be distinguished from copies or unauthorized prints of the genuine original sheet.

Figure 3:
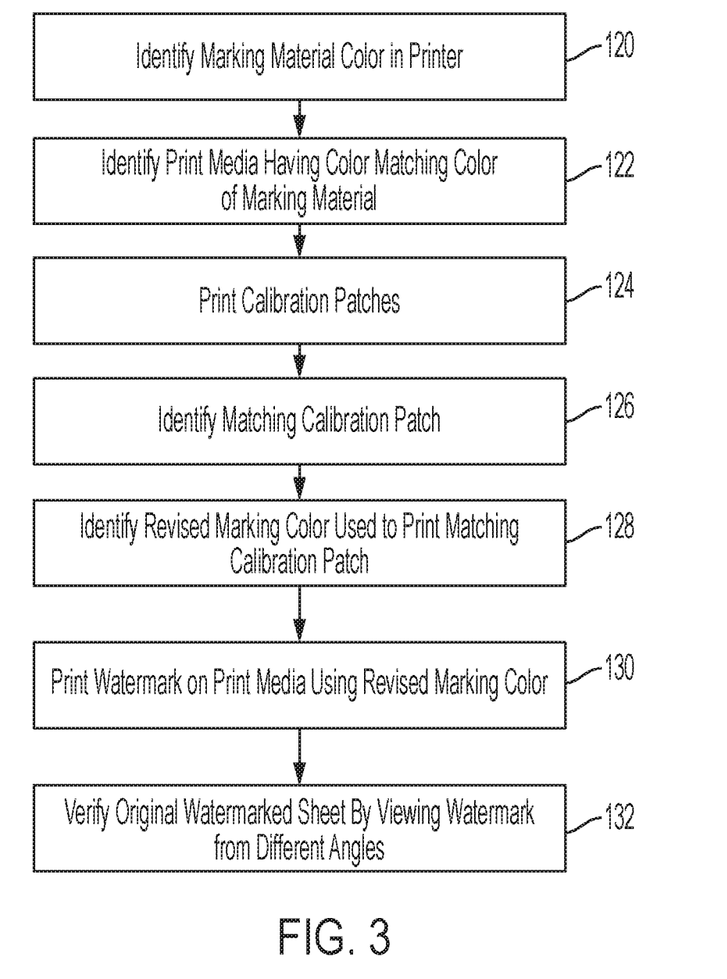
FIG. 3 is a flow diagram of various methods herein.

FIG. 3 is flowchart illustrating exemplary methods herein. In item 120, these methods potentially automatically identify a marking color of a marking material (e.g., ink, toner, etc.) within a printer. The marking material has a marking spectral reflectance property. These methods also potentially automatically identify a print media having a media color approximately matching the marking color but having a media spectral reflectance property that is different from the marking spectral reflectance property in item 122.

The marking color (in 120) and the media color (in 122) form a geometric metameric pair and are, thus, visually matching colors with different spectral reflectance properties, creating a gloss effect. Therefore, when viewed under most or all visible lighting conditions (e.g., approximately the full range of lighting conditions within the human visible spectrum), the media color and the marking color visually match. As noted above, in some examples, the marking spectral reflectance property is different in spectral reflectance from the media spectral reflectance property by at least twice as much spectral reflectance (relative to an arbitrary constant).

Such methods potentially automatically alter the marking color to a revised marking color to cause a printed color of the marking material to visually match the media color. In one example, the marking material is a permanent color and the revised marking color is a mixture of multiple primary and other colors. When altering the marking color, these methods can potentially automatically print differently colored calibration patches of the marking material combined with different colorants on a test sheet of the print media in item 124. Then, in item 126 these methods potentially automatically identify, as a matching calibration patch, one of the calibration patches printed on the test sheet in which the printed color of the marking material most closely visually matches the media color. This allows the methods herein to potentially automatically identify the revised marking color as the color that was used to print the matching calibration patch in item 128.

These methods potentially automatically print a watermark on the print media in item 130 using the revised marking color with the printer. The printing of the watermark is performed by applying at little as a single layer of the marking material to the print media. The difference between the marking spectral reflectance property and the media spectral reflectance property causes the watermark to be visibly observable on the print media from a first (e.g., non-perpendicular) angle and prevents the watermark from being visibly observable on the print media from a second (e.g., perpendicular) angle that is different from the first angle (and this difference produces a gloss effect). Therefore, in item 132, methods herein can potentially automatically verify that the watermarked sheet is original and genuine by an observer moving the sheet relative to their viewing position so as to view the watermark from different angles and thereby view the watermark becoming visible and becoming non-visible as the viewing angle changes from perpendicular to non-perpendicular.

Figure 4A:
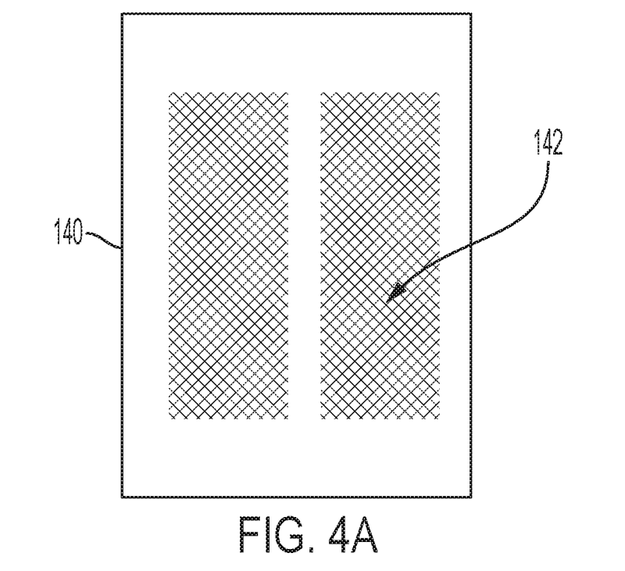
FIGS. 4A-4B are schematic diagrams illustrating a printed sheet having a watermark produced herein viewed from different angles.
Figure 4B:
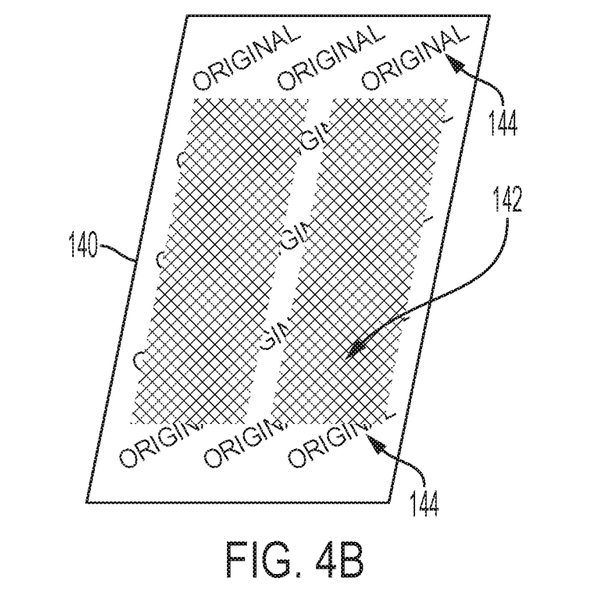

FIGS. 4A-4B show a sheet of media 140 with standard print job printing 142 (e.g., print job data, text, graphics, etc.) thereon that is always visible (e.g., visible from all viewing angles), and a watermark 144 of the word "ORIGINAL" that is only visible from some angles (FIG. 4B shows the same sheet 140 viewed from a different angle from FIG. 4A). As noted above, the difference between the marking spectral reflectance property and the media spectral reflectance property causes the watermark 144 to be visibly observable on the watermark color matching media 140 from a first angle (FIG. 4B), but prevents the watermark 144 from being visibly observable on the print media 140 from a second angle (FIG. 4A) that is different from the first angle (gloss effect). This "second" angle from which the watermark is not observable can be, for example, approximately perpendicular (e.g., within 20% of 90 degrees for example) to the flat surface of the sheet, while in contrast the first angle from which the watermark is observable can be other than (not) perpendicular (e.g., outside 20% perpendicular) to the flat surface of the sheet (as represented by the different sheet angles in FIGS. 4A-4B).

Thus, when a sheet containing such a watermark is copied, the copier's scanner (which is positioned to scan from an angle approximately perpendicular to the flat surface of the sheet) would not detect any difference between the watermark and the sheet, preventing the watermark from appearing in the scanned image or on any copies of the sheet. Further, if a scanner were to detect a color or other difference of the watermark on the sheet, the watermark would appear on the copy from all angles because of the lack of a geometric metameric pair in the copy (e.g., the word "ORIGINAL" would appear in both FIGS. 4A and 4B in such a situation). Additionally, the specific sheet color/spectral reflectance and marking material color color/spectral reflectance used to create such a watermark would not otherwise be present together in a copier or printer, additionally preventing a copier or any other printer from reproducing the watermark.

This allows a genuine original sheet containing the watermark described herein to be easily verified as an original merely by the observer viewing, with an unaided eye, the appearance and disappearance of the watermark (e.g., the word "ORIGINAL") as the sheet is moved to be viewed from different angles. This watermark therefore allows the original to be distinguished from copies (or other unauthorized prints) of the genuine original sheet easily and without special equipment (e.g., merely by having an observer see the appearance and disappearance of the watermark as the sheet is viewed from different angles).

Figure 5:
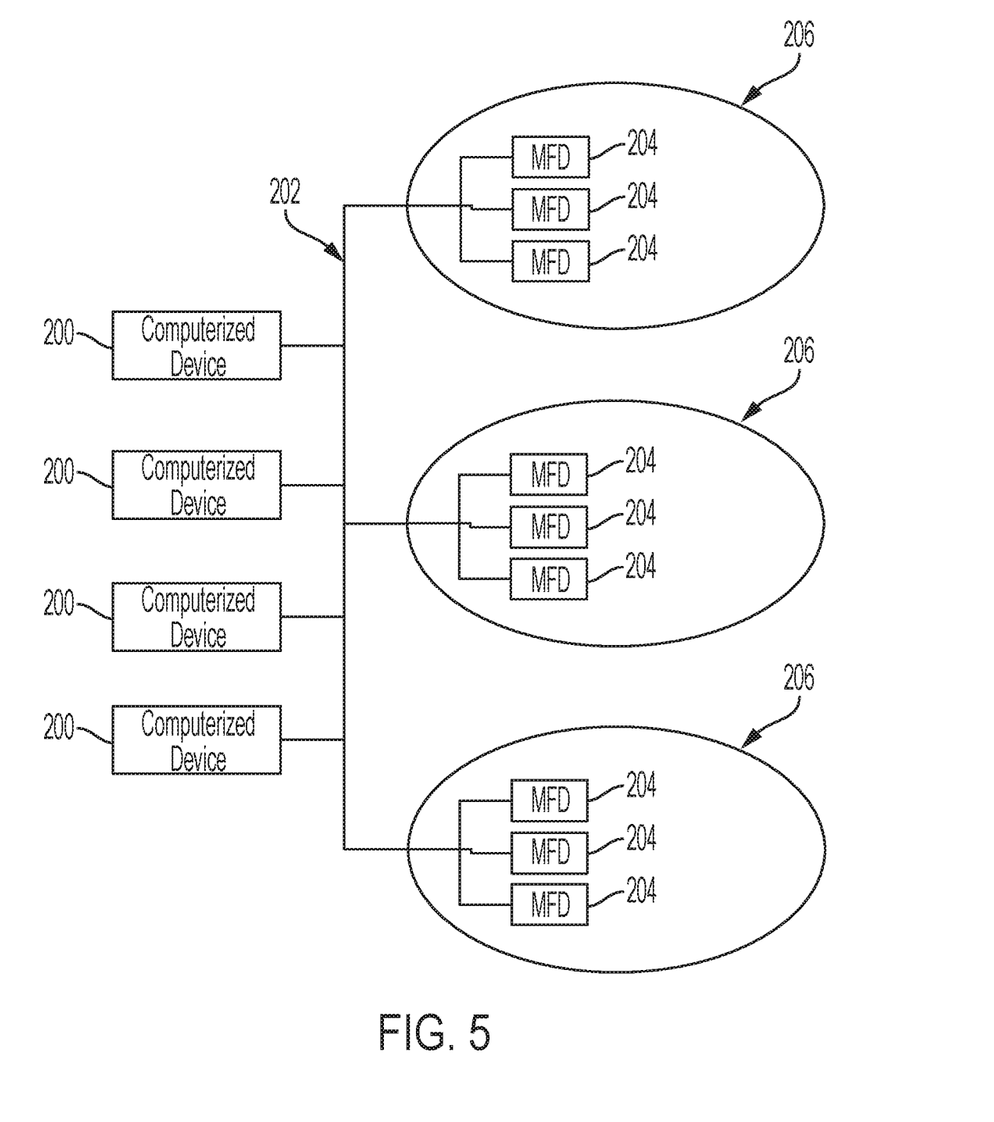
FIG. 5 is a schematic diagram illustrating systems herein.

As shown in FIG. 5, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202; and such devices perform the methods and processing described above.

Figure 6:
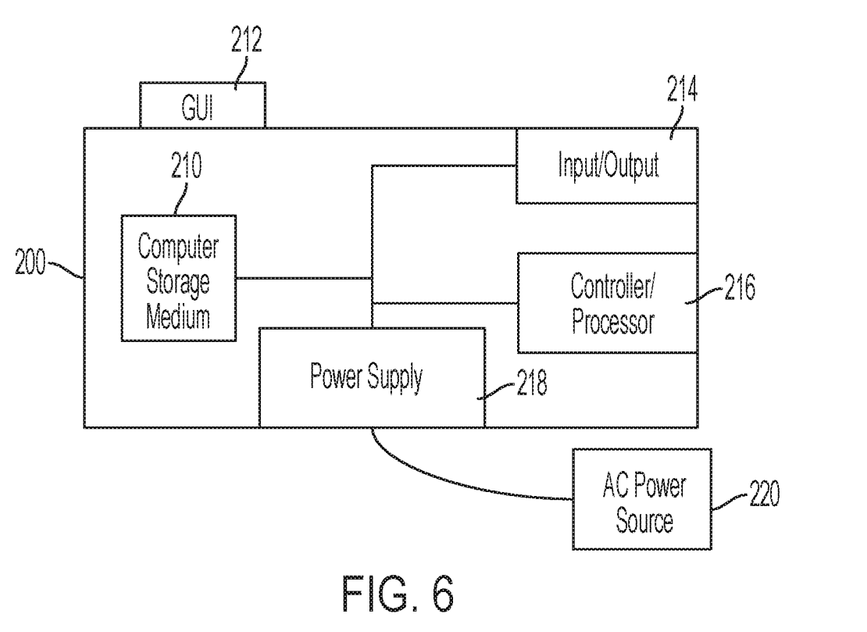
FIG. 6 is a schematic diagram illustrating devices herein.

FIG. 6 illustrates a computerized device 200, which can be used with systems and methods herein to perform the processing described above and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 6, a body housing has one or more functional components that operate on power supplied from an alternating current (AC) source 220 by the power supply 218. The power supply 218 can comprise a common power conversion unit, power storage element (e.g., a battery, etc.), etc.

Figure 7:
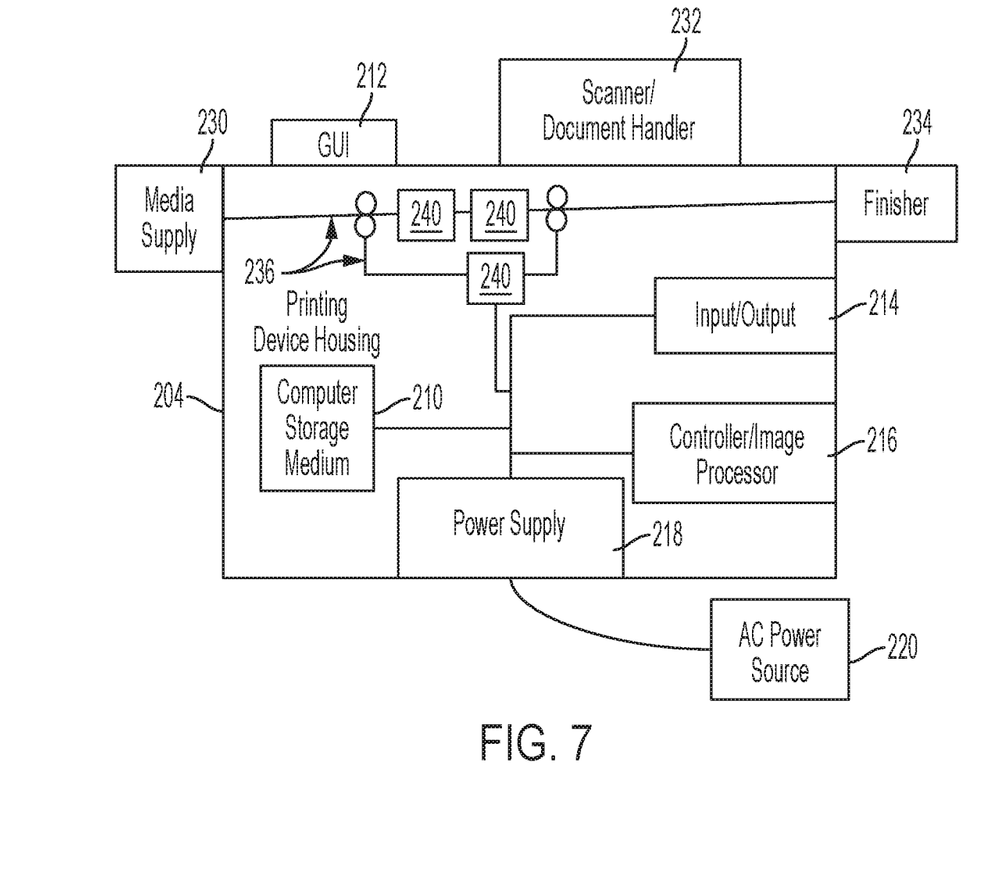
FIG. 7 is a schematic diagram illustrating devices herein.

FIG. 7 illustrates a computerized device that is a printer 204, which can be used with systems and methods herein and can comprise, for example, a printer, copier, multi-function machine, multi-function device (MFD), etc. The printer 204 includes many of the components mentioned above and at least one marking device (printing engine(s)) 240 described above operatively connected to a specialized image processor 216 (which may be different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printer 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printer 204 shown in FIG. 7 is only one example and the systems and methods herein are equally applicable to other types of printing devices that may include fewer components or more components. For example, while a limited number of printing engines and paper paths are illustrated in FIG. 7, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "configured to" or "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   automatically identifying a marking color of a marking material within a printer using a processor of the printer, wherein the marking material has a marking spectral reflectance property;

automatically identifying a print media having a media color matching the marking color and having a media spectral reflectance property that has a different amount of spectral reflectance from the marking spectral reflectance property using the processor;

automatically printing differently colored calibration patches of the marking material combined with different colorants on a test sheet of the print media using a printing engine of the printer;

automatically identifying, as a matching calibration patch, one of the calibration patches printed on the test sheet in which a printed color of the marking material most closely visually matches the media color using an optical scanner of the printer; and automatically identifying a revised marking color used to print the matching calibration patch using the processor; and automatically printing a watermark on the print media by applying the marking material to the print media using the printing engine, wherein the printing of the watermark is performed using the revised marking color.

2. The method according to claim 1, wherein the marking color and the media color comprise a geometric metameric pair and are matching colors with different spectral reflectance properties.

3. The method according to claim 1, wherein the marking spectral reflectance property is different in spectral reflectance from the media spectral reflectance property by at least twice as much spectral reflectance.

4. The method according to claim 1, wherein the marking material comprises a permanent color.

5. The method according to claim 1, wherein a difference between the marking spectral reflectance property and the media spectral reflectance property causes the watermark to be visibly observable on the print media from a first angle and prevents the watermark from being visibly observable on the print media from a second angle that is different from the first angle.

6. The method according to claim 1, wherein the printing of the watermark is performed by applying a single layer of the marking material to the print media.

7. A system comprising:
a printing device comprising:
a storage component specifically configured to maintain a marking material; and
a media supply, wherein the printing device is adapted to print differently colored calibration patches of the marking material combined with different colorants on a test sheet of the print media;
an optical scanner in communication with the printing device, wherein the optical scanner is configured to scan the differently colored calibration patches on the test sheet; and
a processor in communication with the optical scanner and the printing device,
wherein the processor is configured to identify a marking color of the marking material within a storage compartment,
wherein the marking material has a marking spectral reflectance property,
wherein the processor is configured to identify a print media in the media supply having a media color matching the marking color and having a media spectral reflectance property that has a different amount of spectral reflectance from the marking spectral reflectance property, wherein the processor is configured to identify from the scan performed by the optical scanner, as a matching calibration patch, one of the calibration patches printed on the test sheet in which a printed color of the marking material most closely visually matches the media color, wherein the processor is configured to identify a revised marking color used to print the matching calibration patch, and wherein the printing device is configured to print a watermark on the print media using the revised marking color.

8. The system according to claim 7, wherein the marking color and the media color comprise a geometric metameric pair and are matching colors with different spectral reflectance properties.

9. The system according to claim 7, wherein the marking spectral reflectance property is different in spectral reflectance from the media spectral reflectance property by at least twice as much spectral reflectance.

10. The system according to claim 7, wherein the marking material comprises a permanent color and the revised marking color comprises a mixture of multiple permanent colors.

11. The system according to claim 7, wherein a difference between the marking spectral reflectance property and the media spectral reflectance property causes the watermark to be visibly observable on the print media from a first angle and prevents the watermark from being visibly observable on the print media from a second angle that is different from the first angle.

12. The system according to claim 7, wherein the watermark is printed by applying a single layer of the marking material to the print media.

13. A system comprising:
a printing device, wherein the printing device is adapted to print differently colored calibration patches of marking material combined with different colorants on a test sheet of print media;
an optical scanner in communication with the printing device, wherein the optical scanner is configured to scan the differently colored calibration patches on the test sheet; and
a processor in communication with the optical scanner and the printing device,
wherein the processor is configured to identify a marking color of the marking material within a storage compartment,
wherein the marking material has a marking spectral reflectance property,
wherein the processor is configured to identify a print media having a media color matching the marking color and having a media spectral reflectance property that has a different amount of spectral reflectance from the marking spectral reflectance property,
wherein the processor is configured to identify from the scan performed by the optical scanner, as a matching calibration patch, one of the calibration patches printed on the test sheet in which a printed color of the marking material most closely visually matches the media color,
wherein the processor is configured to identify a revised marking color used to print the matching calibration patch, and
wherein the printing device is configured to print a watermark on the print media using the revised marking color.

14. The system according to claim 13, wherein the marking color and the media color comprise a geometric metameric pair and are matching colors with different spectral reflectance properties.

15. The system according to claim 13, wherein the marking spectral reflectance property is different in spectral reflectance from the media spectral reflectance property by at least twice as much spectral reflectance.

16. The system according to claim 13, wherein the marking material comprises a permanent color and the revised marking color comprises a mixture of multiple permanent colors.

17. The system according to claim 13, wherein a difference between the marking spectral reflectance property and the media spectral reflectance property causes the watermark to be visibly observable on the print media from a first angle and prevents the watermark from being visibly observable on the print media from a second angle that is different from the first angle.

18. The system according to claim 13, wherein the watermark is printed by applying a single layer of the marking material to the print media.

\* \* \* \* \*